US007521165B2

(12) United States Patent
Anderson et al.

(10) Patent No.: US 7,521,165 B2

(45) Date of Patent: Apr. 21, 2009

(54) VARNISH

(75) Inventors: Christine D Anderson, Hamilton (CA); T Brian McAneney, Burlington (CA); Gordon Sisler, St. Cathannes (CA); Kurt I Halfyard, Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/278,754

(22) Filed: Apr. 5, 2006

(65) Prior Publication Data

US 2007/0238813 A1 Oct. 11, 2007

(51) Int. Cl.

| | |
|---|---|
| ***G03G 13/16*** | (2006.01) |
| ***G03G 13/00*** | (2006.01) |
| ***G03G 13/06*** | (2006.01) |
| ***G03G 5/00*** | (2006.01) |
| ***C08F 2/16*** | (2006.01) |
| ***C08F 2/22*** | (2006.01) |
| ***C08K 5/16*** | (2006.01) |
| ***C08K 5/42*** | (2006.01) |

(52) U.S. Cl. ........................ 430/126.1; 430/31; 430/97; 430/126.2; 430/132; 524/800; 524/804; 524/186; 524/157

(58) Field of Classification Search ................... 430/31, 430/97, 126.1, 126.2, 132; 524/800, 804, 524/186, 157

See application file for complete search history.

(56) References Cited

U.S. PATENT DOCUMENTS 3,590,000 A 6/1971 Palermiti et al.
4,243,694 A 1/1981 Mansukhani
4,265,990 A 5/1981 Stolka et al.
4,558,108 A 12/1985 Alexandru et al.
4,563,408 A 1/1986 Lin et al.
4,584,253 A 4/1986 Lin et al.
4,585,884 A 4/1986 Lin et al.
4,911,830 A 3/1990 Bromley et al.
4,952,293 A * 8/1990 Sypula et al. ............... 204/479
5,223,368 A 6/1993 Ciccarelli et al.
5,227,460 A 7/1993 Mahabadi et al.
5,274,025 A * 12/1993 Stockl et al. ................ 524/513
5,278,020 A 1/1994 Grushkin et al.
5,290,654 A 3/1994 Sacripante et al.
5,308,734 A 5/1994 Sacripante et al.
5,344,738 A 9/1994 Kmiecik-Lawrynowicz et al.
5,346,795 A 9/1994 Pickering et al.
5,346,797 A 9/1994 Kmiecik-Lawrynowicz et al.
5,348,832 A 9/1994 Sacripante et al.
5,364,729 A 11/1994 Kmiecik-Lawrynowicz et al.
5,366,840 A 11/1994 Larson et al.
5,366,841 A 11/1994 Patel et al.
5,370,963 A 12/1994 Patel et al.
5,403,693 A 4/1995 Patel et al.
5,405,728 A 4/1995 Hopper et al.
5,418,108 A 5/1995 Kmiecik-Lawrynowicz et al.
5,496,676 A 3/1996 Croucher et al.
5,501,935 A 3/1996 Patel et al.
5,510,220 A 4/1996 Nash et al.
5,527,658 A 6/1996 Hopper et al.
5,554,480 A 9/1996 Patel et al.
5,585,215 A 12/1996 Ong et al.
5,593,807 A 1/1997 Sacripante et al.
5,627,002 A 5/1997 Pan et al.
5,650,255 A 7/1997 Ng et al.
5,650,256 A 7/1997 Veregin et al.
5,705,554 A 1/1998 Chou et al.
5,709,976 A * 1/1998 Malhotra ............... 430/124.54
5,723,253 A 3/1998 Higashino et al.
5,729,813 A * 3/1998 Eddy et al. .................. 399/333
5,744,520 A 4/1998 Kmiecik-Lawrynowicz et al.
5,747,215 A 5/1998 Ong et al.
5,763,133 A 6/1998 Ong et al.
5,766,818 A 6/1998 Smith et al.
5,804,349 A 9/1998 Ong et al.
5,826,147 A 10/1998 Liu et al.
5,827,633 A 10/1998 Ong et al.
5,840,462 A 11/1998 Foucher et al.
5,853,944 A 12/1998 Foucher et al.
5,858,601 A 1/1999 Ong et al.
5,863,698 A 1/1999 Patel et al.
5,869,215 A 2/1999 Ong et al.
5,902,710 A 5/1999 Ong et al.
5,910,387 A 6/1999 Mychajlowskij et al.
5,916,725 A 6/1999 Patel et al.
5,919,595 A 7/1999 Mychajlowskij et al.
5,925,488 A 7/1999 Patel et al.
5,966,570 A 10/1999 Till et al.
5,977,210 A 11/1999 Patel et al.
6,017,992 A * 1/2000 Haddleton et al. .......... 524/458
6,140,386 A * 10/2000 Vanderhoff et al. ........... 522/78
6,177,221 B1 1/2001 Maniar et al.
6,180,308 B1 1/2001 Pan et al.

(Continued)

FOREIGN PATENT DOCUMENTS

EP 0 675 177 A 10/1995

(Continued)

*Primary Examiner*—Vasu Jagannathan
*Assistant Examiner*—Karuna P Reddy
(74) *Attorney, Agent, or Firm*—Oliff & Berridge, PLC

(57) ABSTRACT

A varnish composition and the method of making a varnish composition comprising at least one latex emulsion, water, at least one amino alcohol or at least one alkali base and at least one surfactant.

21 Claims, No Drawings

U.S. PATENT DOCUMENTS

| | | | |
|---|---|---|---|
| 6,187,499 B1 | 2/2001 | Zhao et al. | |
| 6,212,347 B1 | 4/2001 | Zhao et al. | |
| 6,319,647 B1 | 11/2001 | Gutman et al. | |
| 6,365,316 B1 | 4/2002 | Stamp et al. | |
| 6,416,916 B1 | 7/2002 | Silence et al. | |
| 2005/0250039 A1 | 11/2005 | Halfyard et al. | |
| 2006/0063868 A1 * | 3/2006 | Janmaat et al. | 524/160 |

FOREIGN PATENT DOCUMENTS

| | | |
|---|---|---|
| EP | 0 823 670 A | 2/1998 |

* cited by examiner

VARNISH

TECHNICAL FIELD

Described herein is a varnish for use in electrostatographic printing and imaging systems. The disclosed varnish possesses for example, excellent compatibility with photoreceptors and has excellent substrate wetting characteristics. Specifically, disclosed herein is a varnish for overcoating a printed or xerographic image, comprising at least one latex emulsion, water, at least one amino alcohol or at least one alkali base and at least one surfactant.

BACKGROUND

A number of toners may, in some situations, lack the ability to permanently remain on a medium after printing, for example in a printing or xerographic process. It is especially important for an image printed on a material to be used in packaging or mailing to be permanent, as packages are frequently bent and twisted and subjected to rubbing.

In electrostatographic imaging, electrostatic latent images are formed on a surface by uniformly charging a charge retentive surface, such as a photoreceptor. The charged area is then selectively dissipated in a pattern of activating radiation corresponding to the original image. The latent charge pattern remaining on the surface corresponds to the area not exposed by radiation. Next, the latent charge pattern is visualized by passing the photoreceptor past one or more developer housings comprising toner, which adheres to the charge pattern by electrostatic attraction. The developed image is then fixed to the imaging surface or is transferred to a receiving substrate, such as paper, to which it is fixed by a suitable fusing technique, resulting in a xerographic print or toner-based print. Once an image is printed, an overcoat varnish may be placed over the image in accordance with aspects of the disclosure illustrated herein.

REFERENCES

For forming the image, toners such as emulsion aggregation toners or conventional mechanically made toners may be used. Thus, a toner may also be prepared by the well known emulsion aggregation processes. The processes for the preparation of toner are illustrated in a number of Xerox patents, the disclosures of which are totally incorporated herein in their entirety by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, U.S. Pat. No. 5,346,797, U.S. Pat. No. 6,177,221, U.S. Pat. No. 6,319,647, U.S. Pat. No. 6,365,316, U.S. Pat. No. 6,416,916, U.S. Pat. No. 5,510,220, U.S. Pat. No. 5,227,460, U.S. Pat. No. 4,558,108, and U.S. Pat. No. 3,590,000. Also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,910,387; 5,919,595; 5,916,725; 5,902,710; 5,863,698, 5,925,488; 5,977,210 and 5,858,601. The appropriate components and process parameters of the above Xerox patents may be selected for use in embodiments described herein.

A number of commercially available aqueous varnishes are commonly used in the industry of offset printing. However, the use of these commercial aqueous varnishes with xerographic printing presses may provide unsatisfactory results for at least two reasons: (1) varnish incompatibility with the photoreceptor, and (2) substrate wetting issues.

Most commercially available aqueous varnishes are supplied at a pH of about 8 to about 10 in order to stabilize the latex emulsions. This is accomplished by adding ammonia in relatively nominal levels, for example, from about 1 weight percent to about 2 weight percent of the total formulation. The presence of ammonia in an overprint formulation may be undesirable for xerographic printing due to the fact that it can cause degradation to the photoreceptor. Therefore, a varnish that uses a photoreceptor compatible base to stabilize a latex derived formulation is desired.

Further, some commercial aqueous varnishes have high static surface tension values due to their large water content, for example, from about 40 weight percent to about 60 weight percent of the total formulation. In coating applications, minimizing the difference between the surface tensions of the coating and substrate to be from about 0 to about 10 mN/m may ensure complete wetting of the print. In offset printing, which uses an ink-based application for making prints, the surface tension differential between the substrate and varnish is relatively small, such as from about 0 to about 5 mN/m. This is not the case for xerographically prepared prints. The increased differential for xerographic prints is due to the fact that fuser oil (which has an inherently low static surface tension) is often applied to the entire print in order to aid in its release from the fuser roll. This difference in static surface tensions may lead to substrate wetting problems, such as spotty coverage of the print, especially in in-line coating applications. In other words, such a varnish may fail to wet the substrate. Therefore, an aqueous varnish having a similar static surface tension to that of the fuser oil is desirable.

As pressrooms continue to make the switch from offset printing to xerographic or electrostatographic printing, a need to accommodate the customer with in-line press options is continuing to grow. A current, predominant offset press option is to cover prints with a coating in order to improve image robustness as well as aesthetic value. Two options for this treatment include UV curable and aqueous based coatings. Aqueous coatings may provide a significant cost savings over UV curable coatings due to the components used in the formulations. Therefore, an aqueous based coating, which does not contain ammonia and has a low static surface tension would be compatible with a xerographic printing press. This, in turn, would afford the digital printing press customer with a viable, system-compatible alternative to current commercial aqueous coatings.

SUMMARY

In embodiments, described is a varnish composition employed in protecting electrostatographic prints comprising at least one latex emulsion, water, at least one amino alcohol or at least one alkali base and at least one surfactant.

Also described is a method of making a varnish composition, comprising providing a latex emulsion comprised of at least one latex, pre-blending water and at least one surfactant to generate a pre-blended aqueous mixture, adding the pre-blended aqueous mixture to the latex emulsion and then mixing to generate an aqueous latex emulsion, and adding an amino alcohol to the aqueous latex emulsion.

In yet further embodiments, disclosed is a recording medium with a toner image thereon, wherein fuser oil at least partially covers the toner image, and a varnish covers the partially-covered toner image and substrate. The varnish composition prior to application and drying comprises at least one latex emulsion, water, at least one amino alcohol or at least one alkali base, and at least one surfactant.

EMBODIMENTS

Disclosed herein is a varnish composition comprising at least one latex emulsion, water, at least one amino alcohol or at least one alkali base and at least one surfactant. The varnish may optionally contain one or more viscosity modifiers. The varnish is free of or substantially free of ammonia and thus does not negatively affect the photoreceptor used in xerographic and similar devices.

At least one latex emulsion refers to from 1 to about 10 latex emulsions that are combined, such as from 1 to about 5 latex emulsions or from 1 to about 3 latex emulsions, in the varnish composition. The overall latex emulsion mixture may have a glass transition temperature ($T_g$) of, for example, from about 30° C. to about 95° C., such as from about 35° C. to about 85° C. or from about 35° C. to about 70° C. To achieve this range of $T_g$, more than one latex emulsion may be used. In other words, various latex emulsions may be combined to achieve the desired $T_g$. For example, a latex emulsion having a $T_g$ lower than the desired final $T_g$ may be employed with additional latex emulsion(s) having a higher $T_g$, or a latex emulsion having a $T_g$ higher than the desired $T_g$, such as from about 95° C. to about 150° C., or more. Any combination of one or more latex emulsions may be combined, as long as the desired $T_g$ range for the overall latex emulsion mixture is achieved. The $T_g$ may be measured by differential scanning calorimetry (DSC) using, for example, a DSC 2920 (obtained from TA Instruments) or dynamic mechanical analysis using, for example, a Rheometric Scientific RSA-II Solid Analyzer.

In embodiments, the latex emulsion may include styrene/acrylic emulsions, acrylic emulsions, polyester emulsions or mixtures thereof.

Examples of acrylic latex emulsions include poly(alkyl methacrylate-alkyl acrylate), poly(alkyl methacrylate-aryl acrylate), poly(aryl methacrylate-alkyl acrylate), poly(alkyl methacrylate-acrylic acid), and poly(alkyl acrylate-acrylonitrile-acrylic acid); the latex contains a resin selected from the group consisting of poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(methyl methacrylate-isoprene), poly(ethyl methacrylate-isoprene), poly(propyl methacrylate-isoprene), poly (butyl methacrylate-isoprene), poly(methyl acrylate-isoprene), poly(ethyl acrylate-isoprene), poly(propyl acrylate-isoprene) and poly(butyl acrylate-isoprene).

Examples of styrene/acrylic latex emulsions include poly (styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(styrene-alkyl acrylate-acrylonitrile-acrylic acid), and poly(styrene-1,3-diene-acrylonitrile-acrylic acid); the latex contains a resin selected from the group consisting of poly(styrene-butadiene), poly(methylstyrene-butadiene), polystyrene-isoprene), poly(methylstyrene-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid).

Examples of specific acrylic latex emulsions suitable for use herein include RHOPLEX® HA-12 & RHOPLEX® I-2074 available from Rohm & Haas, Co. Examples of styrene/acrylic latex emulsions include ACRONAL S728, ACRONAL, NX4533 and ACRONAL S888S from BASF. Water based acrylic or styrene/acrylic emulsions may be self-crosslinking and/or alkali soluble and supplied on the acid side (un-neutralized).

Examples of suitable polyester latex emulsions include polyethylene-terephthalate, polypropylene-terephthalate, polybutylene-terephthalate, polypentylene-terephthalate, polyhexylene-terephthalate, polyheptadene-terephthalate, polyoctalene-terephthaloate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-furnarate), poly(propoxylated bisphenol-succinate), poly(propoxylated bisphenol-adipate) and poly(propoxylated bisphenol-glutarate).

In embodiments, the varnish may include one or more latex emulsions in a total amount from about 40 weight percent to about 95 weight percent, such as from about 50 weight percent to about 90 weight percent or from about 60 weight percent to about 90 weight percent. If one or more latex emulsions is utilized, each latex emulsion may be present in an amount from about 1 weight percent to about 94 weight percent of the varnish, such as from about 5 weight percent to about 90 weight percent or from about 10 weight percent to about 85 weight percent of the varnish. Each latex emulsion may be present in any amount as long as the total amount of the latex emulsion in the varnish is within the desired range and has the desired $T_g$.

The varnish disclosed herein further includes at least one amino alcohol or at least one alkali base.

At least one amino alcohol refers to, for example, from 1 to about 10 amino alcohols that are combined, such as from 1 to about 5 amino alcohols or from 1 to about 3 amino alcohols, in the varnish composition. An amino alcohol refers, for example, to a compound having amino group(s) associated with an alkyl alcohol or an aryl alcohol. For example, the alkyl alcohol may include from about 1 to about 36 carbon atoms, such as from about 1 to about 30 carbon atoms or from about 1 to about 15 carbon atoms. An alkyl alcohol may be linear, branched or cyclic and includes, for example, methanol, ethanol, propanol, isopropanol and the like. Aryl alcohols may include from about 6 to 36 carbon atoms, such as from about 6 to about 30 carbon atoms or from about 6 to about 15 carbon atoms. An aryl alcohol includes, for example, cyclobutyl, cyclopentyl, phenyl and the like. One or more amino groups refers to, for example, from about 1 to about 10 amino groups, such as from 1 to about 5 amino groups or from 1 to about 3 amino groups.

Examples of the amino alcohol include, 2-aminoethanol, 2-aminopropanol, 2-aminobutanol, 2-aminohexanol, 2-methyl-2-aminoethanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-1,3-propanediol, 2-amino-2-ethyl-1,3-propanediol, 3-amino-1,2-propanediol and tris-(hydroxymethyl)-aminomethane, triisopropanolamine and 2-dimethylamino-2-methyl-1-propanol and similar substances.

At least one alkali base refers to, for example, from 1 to about 10 alkali bases that are combined, such as from 1 to about 5 alkali bases or from 1 to about 3 alkali bases, in the varnish composition. Examples of alkali base include KOH, LiOH, RbOH, CsOH, NaOH and the like.

The varnish may include an amino alcohol or alkali base in an amount from about 1 weight percent to about 5 weight percent, such as from about 1 weight percent to about 4 weight percent or from about 1 weight percent to about 3 weight percent, of the varnish.

The varnish may further include at least one surfactant. At least one surfactant refers to, for example, from 1 to about 10 surfactants that are combined, such as from 1 to about 5 surfactants or from 1 to about 3 surfactants, in the varnish composition. This additional surfactant is not inclusive of the surfactant that may be included in the original latex emulsions. The surfactant added to the varnish may be included to assist in adjusting the surface tension of the varnish as more fully discussed below. Suitable surfactants for use herein include anionic surfactants, nonionic surfactants, silicone surfactants and fluorosurfactants.

Anionic surfactants may include sulfosuccinates, disulfonates, phosphate esters, sulfates, sulfonates, and mixtures thereof.

Examples of nonionic surfactants include polyvinyl alcohol, polyacrylic acid, isopropyl alcohol, acetylenic diols, octyl phenol ethoxylate, branched secondary alcohol ethoxylates, perfluorobutane sulfonates and alcohol alkoxylates.

Silicone surfactants are well known in the art and include polyether modified poly-dimethyl-siloxane and the like.

Examples of fluorosurfactants suitable for use herein may include ZONYL® FSO-100 (E.I. Du Pont de Nemours and Co., Wilmington, Del.), having the formula $RfCH_2CH_2O(CH_2CH_2O)xH$, wherein $Rf=F(CF_2CF_2)y$, x=0 to about 15, and y=1 to about 7, FLUORADS® FC430, FC170C, FC171, and the like, available from 3M, ethoxylated nonyl phenol from Aldrich, and the like.

The varnish composition may include one or more surfactants in a total amount from about 0.001 weight percent to about 5 weight percent, such as from about 0.001 weight percent to about 4 weight percent or from about 0.01 weight percent to about 3 weight percent, of the varnish. The total amount of surfactants in the varnish refers to the surfactant added to the varnish composition, not to any surfactant found in the latex emulsions. In other words, the amount of total surfactant is not inclusive of any surfactant that may be included in the latex emulsions.

Considering surfactants present in the latex emulsions, the total amount of surfactants in the varnish may be in the range of from about 1 to about 8, such as from about 2 to about 7 or from about 3 to about 5 weight percent, of the varnish composition. If one or more surfactants is utilized, each surfactant may be present in an amount from about 0.01 weight percent to about 7.99 weight percent of the varnish, such as from about 0.1 weight percent to about 7.9 weight percent or from about 1 weight percent to about 7 weight percent of the varnish.

The varnish disclosed herein may optionally include one or more rheological or viscosity modifiers. One or more viscosity modifiers refers to, for example, from 1 to about 10 viscosity modifiers that are combined, such as from 1 to about 5 viscosity modifiers or from 1 to about 3 modifiers, in the varnish composition. Examples of viscosity modifiers include alkali-swellable acrylic thickeners, such as ACRYSOL® ASE-60 (available from Rohm & Haas), ACRYSOL® ASE-75, RHEOLATE® 450 and RHEOLATE® 420, and associative thickeners, such as ELEMENTIS RHEOLATE®255, RHEOLATE® 216 and RHEOLATE® 1.

The varnish may optionally include one or more viscosity, modifiers in an amount from about 0.01 weight percent to about 8 weight percent, such as from about 0.01 weight percent to about 5 weight percent or from about 0.1 weight percent to about 5 weight percent, of the varnish.

The varnish incorporates water in an amount from about 30 weight percent to about 80 weight percent, such as from about 35 weight percent to about 75 weight percent or from about 40 weight percent to about 70 weight percent, of the varnish.

In embodiments, further conventional optional additives may include coalescing aids, wax, anti-foaming agents, matting agents, pigments, UV absorbers, biocides, crosslinking agents, and the like.

In embodiments, the varnish may include optional additives known to those skilled in the art in an amount from about 0.1 weight percent to about 8 weight percent, such as from about 0.1 weight percent to about 10 weight percent or from about 1 weight percent to about 10 weight percent, of the varnish.

Examples of waxes suitable for use herein include functionalized waxes, polypropylenes and polyethylenes. Wax emulsion may be available from Michaelman Inc., Daniels Products Company, Eastman Chemical Products, Inc., and Sanyo Kasei K.K., Commercially available polyethylenes usually possess a molecular weight of from about 1,000 to about 1,500, while the commercially available polypropylenes are believed to have a molecular weight of from about 4,000 to about 5,000. Examples of functionalized waxes include amines, amides, imides, esters, quaternary amines, carboxylic acids or acrylic polymer emulsions. Examples of polyethylene waxes include JONWAX 26 & 28 available from SC Johnson Wax, and chlorinated polpropylenes and polyethylenes commercially available from Allied Chemical, Petrolite Corporation and SC Johnson wax. When utilized, the wax may be present in the varnish in an amount from about 1 weight percent to about 8 weight percent, such as from about 1 weight percent to about 6 weight percent or from about 2 weight percent to about 5 weight percent, of the varnish composition.

Matting agents may be used in the formulation and may include silicas, silica gels, aluminum silicates and waxes, as described above, and the like.

Colorants may be employed in the varnish composition and may include pigments or dyes. In general, useful colorants or pigments include carbon black, magnetite, or mixtures thereof; cyan, yellow, magenta, or mixtures thereof, or red, green, blue, brown, or mixtures thereof. Specific useful colorants include Paliogen Violet 5100 and 5890 (BASF), Normandy Magenta RD2400 (Paul Uhlich), Permanent Violet VT2645 (Paul Uhlich), Heliogen Green L8730 (BASF); Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD Red (Aldrich), Lithol Rubine Toner (Paul Uhlich), Lithol Scarlet 4440, NBD 3700 (BASF), Bon Red C (Dominion Color), Royal Brilliant Red RD-8192 (Paul Uhlich), Oracet Pink RF (Ciba Geigy), Paliogen Red 3340 and 3871 K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgabite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR2673 (Paul Uhlich), Paliogen Yellow 152 and 1560 (BASF), Lithol Fast Yellow 0991K (BASF), Paliotol Yellow 1840 (BASF), Novaperm Yellow FGL (Hoechst)$_3$, Permanent Yellow YE 0305 (Paul Uhlich), Lumogen Yellow D0790 (BASF), Suco-Gelb L1250 (BASF), Suco-Yellow D1355 (BASF), Sico Fast Yellow D1165, D1355 and D1351 (BASF), Hostaperm Pink E (Hoechst), Fanal Pink D4830 (BASF), Cinquasia Magenta (DuPont), Paliogen Black L0084 (BASF), Pigment Black K801 (BASF) and carbon blacks such as REGAL 330 (Cabot), Carbon Black 5250 and 5750 (Columbian Chemicals), and the like or mixtures thereof.

Additional useful colorants include pigments in water based dispersions such as those commercially available from Sun Chemical, for example SUNSPERSE BHD 6011X (Blue 15 Type), SUNSPERSE BHD 9312X (Pigment Blue 15 74160), SUNSPERSE BHD 6000X (Pigment Blue 15:3 74160), SUNSPERSE BHD 9600X and GHD 6004X (Pigment Green 7 74260), SUNSPERSE QHD 6040X (Pigment Red 122 73915), SUNSPERSE RHD 9668X (Pigment Red 185 12516), SUNSPERSE RHD 9365X and 9504X (Pigment Red 57 15850:1, SUNSPERSE YHD 6005X (Pigment Yellow 83 21108), FLEXIVERSE YFD 4249 (Pigment Yellow 17 21105), SUNSPERSE YHD 6020X and 6045X (Pigment Yellow 74 11741), SUNSPERSE YHD 6001X and 9604X (Pigment Yellow 14 21095), FLEXVERSE LFD 4343 and LFD 9736 (Pigment Black 7 77226) and the like or mixtures thereof. Other useful water based colorant dispersions commercially available from Clariant include HOSTAFINE Yellow GR, HOSTAFINE Black T and Black TS, HOSTAFINE Blue B2G, HOSTAFINE Rubine 17613 and magenta dry pigment such as Toner Magenta 6BVP2213 and Toner Magenta E02 which can be dispersed in water and/or surfactant prior to use.

Other useful colorants include magnetites, such as Mobay magnetites M08029, M08060; Columbian magnetites; MAPICO BLACKS and surface treated magnetites; Pfizer magnetites CB4799, CB5300, CB5600, MCX6369; Bayer magnetites, BAYFERROX 8600, 8610; Northern Pigments magnetites, NP-604, NP-608; Magnox magnetites TMB-100, or TMB-104; and the like or mixtures thereof. Specific additional examples of pigments include phthalocyanine HELIOGEN BLUE L6900, D6840, D7080, D7020, PYLAM OIL BLUE, PYLAM OIL YELLOW, PIGMENT BLUE 1 available from Paul Uhlich & Company, Inc., PIGMENT VIOLET 1, PIGMENT RED 48, LEMON CHROME YELLOW DCC 1026, E.D. TOLUIDNE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Examples of magentas include, for example, 2,9-dienethyl-substituted quinacridone and anthraquinone dye identified in the Color Index as CI-60710, CI Dispersed Red 15, diazo dye identified in the Color Index as CI 26050, CI Solvent Red 19, and the like or mixtures thereof. Illustrative examples of cyans include copper tetra(octadecyl sulfonamido) phthalocyanine, x-copper phthalocyanine pigment listed in the Color Index as CI74160, CT Pigment Blue, and Anthrathrene Blue, identified in the Color Index as CI 69810, Special Blue X-2137, and the like or mixtures thereof; while illustrative examples of yellows that may be selected are diarylide yellow 3,3-dichlorobetizidene acetoacetanilides, a monoazo pigment identified in the Color Index as CI12700, CI Solvent Yellow 1.6, a nitrophenyl amine sulfonamide identified in the Color Index as Foron Yellow SE/GLN, CI Dispersed Yellow 33 2,5-dienethoxy-4-sulformanilide phenylazo-4'-chloro-2,5-dienethoxy acetoacetanilide, and Permanent Yellow FGL. Colored magnetites, such as mixtures of MAPICO BLACK and cyan components may also be selected as pigments with the process disclosed herein. Colorants include pigment, dye, mixtures of pigment and dye, mixtures of pigments, mixtures of dyes, and the like. It is to be understood that other useful colorants will become readily apparent to one of skill in the art based on the present disclosure.

Dyes that are invisible to the naked eye but detectable when exposed to radiation outside the visible wavelength range (such as ultraviolet or infrared radiation), such as dansyllysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl) stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphlthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I., 290), BCR, BS, and the like (available from Leucophor), and the like, are also suitable for use as a colorant.

In addition, suitable colorants that can be used herein include one or more fluorescent colorants, which can be pigments, dyes, or a mixture of pigments and dyes. For example, suitable fluorescent pigment concentrates are disclosed in, for example, U.S. Pat. No. 4,911,830, the entire disclosure of which is incorporated herein by reference, and suitable fluorescent colorants are disclosed in, for example, U.S. Pat. Nos. 4,243,694 and 5,554,480, the entire disclosures of which are incorporated herein by reference. Suitable inorganic fluorescent pigments can be prepared, for example, by adding trace amounts of activating agents such as copper, silver and manganese to high purity sulfides of heavy metals or alkaline earth metals such as zinc sulfide, which are used as raw materials, and calcining them at a high temperature. Suitable organic fluorescent pigments cap be prepared, for example, by dissolving fluorescent dyes in the vehicles of synthetic resins or ones prepared by dyeing the dispersed matters of fine resin particles obtained by emulsion polymerization or suspension polymerization with fluorescent dyes. The synthetic resins can include, but are not limited to, vinyl chloride resins, alkid resins and acrylic resins, and the fluorescent dyes include, but are not limited to, C.I. acid yellow 7, C.I. basic red 1 and the like.

Although not limited thereto, suitable fluorescent dyes include, but are not limited to, those belonging to the dye families known as rhodamines, fluoresciens, coumarins, napthalimides, benzoxanthenes, acridines, azos, and the like. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160 and Fluorescent Brightner 61. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, and the like.

An anti-foaming agent, such as BYK-019 & BYK-028, water based polysiloxane anti-foaming agents, available from Dempsey Corp, or the equivalent may be added.

Coalescing aids, if present, may include polyglycol ethers, such as Butyl Carbitol & Dowanol DPnB (Dow Corp). The coalescing aid may be present in the varnish in an amount from 0 weight percent to about 8 weight percent, such as from about 0 weight percent to about 6 weight percent or from about 2 weight percent to about 5 weight percent, of the varnish.

UV absorbers may be included in the varnish composition and may include benzophenone derivatives (such as SANDUVOR® 3041), hydroxyphenyltriazine (SANDUVOR® TB-01), CIBAFAST® HLiq, and CIBA TINUVIN® 1130.

Biocides may be incorporated into the varnish composition and may include organosulfur, organohaleogens, phenates, chlorophenates, heterocyclic nitrogen compounds, organic esters, quaternary ammonium compounds, inorganic boron compounds.

Crosslinking agents suitable for use herein include thermosetting resins, such as CYMEL® 303, and oxalic acid.

The viscosity of the varnish prior to drying may be from about 50 cP to about 750 cP, such as from about 100 cp to about 700 cP or from about 100 cP to about 650 cP, at room temperature (approximately 25° C.). The static surface tension of the varnish prior to drying may be from about 15 mN/m to about 40 mN/m, such as from about 20 mN/m to about 40 mN/m or from about 20 mN/m to about 30 mN/m.

The vanish may be applied to any type of substrate, such as, for example, paper, including wherein the substrate has a residue of fuser-oil (such as functionalized silicone oil), to completely wet the surface. The substrate can contain additives including, but not limited to, anti-curl compounds, such as, for example, trimethylolpropane, biocides, humectants, chelating agents, and mixtures thereof, and/or any other optional additives known in the art for enhancing the performance and/or value of the toner and/or substrate.

The varnish may be applied to the substrate at any suitable time after image formation. For example, the varnish may be applied to the substrate immediately after the image is formed, such as in an inline coating apparatus where the printing and overcoating are conducted by the same printing device, of after a short or long delay after printing, such as in an offline coating apparatus where the printing and overcoating are conducted by different printings devices. Furthermore, the varnish may be applied over the entire substrate, the entire image, parts of the substrate, or parts of the image. For example, the composition may be applied to both imaged areas and non-imaged areas, it can be applied only to imaged areas, or it can be applied only to non-imaged areas. In embodiments, the varnish is applied over the entire substrate, including toner imaged and non-imaged areas, to provide more uniform gloss and surface properties. The toner-based image on the substrate desirably may have been previously prepared by any suitable xerographic process comprising, for example, generating an electrostatic image, developing the electrostatic image with toner, and transferring the developed toner-based image to a substrate, or modifications thereof, known in the art of xerography.

More specifically, methods for generating images coated with the varnish disclosed herein comprise: generating an electrostatic latent image on a photoconductive imaging member, developing the latent image with toner, transferring the developed electrostatic image to a substrate, and coating the substrate or parts thereof and/or image or parts thereof with a varnish. Development of the image may be achieved by a number of methods known in the art, such as, for example, cascade, touchdown, powder cloud, magnetic brush, and the like. Transfer of the developed image to the substrate may be by any method, including, but not limited to, those making use of a corotron or a biased roll. The fixing may be performed by means of any suitable method, such as, for example, flash fusing, heat fusing, pressure fusing, vapor fusing, and the like. Suitable imaging methods, devices, and systems are known in the art and include those described in U.S. Pat. Nos. 4,585,884, 4,584,253, 4,563,408, 4,265,990, 6,180,308, 6,212,347, 6,187,499, 5,966,570, 5,627,002, 5,366,840; 5,346,795, 5,223,368, and 5,826,147, the entire disclosures of which are incorporated herein by reference.

Liquid film coating devices can be used for applying the varnish composition, including roll coaters, rod coaters, blades, wire bars, air-knives, curtain coaters, slide coaters, doctor-knives, screen coaters, gravure coaters, such as, for example, offset gravure coaters, slot coaters, and extrusion coaters. Such devices may be used in a known manner, such as, for example, direct and reverse roll coating, offset gravure, curtain coating, lithographic coating, screen coating, and gravure coating. In embodiments, coating of the varnish is accomplished using a two or three roll coater, Typical varnish deposition levels, expressed as mass per unit area, can be from about 1 $g/m^2$ to about 10 $g/m^2$, such as about 5 $g/m^2$.

The varnish may be used with a xerographic engine producing fused toner images at least partially covered with fuser oil, such as silicone oil. The varnish formulation disclosed herein uniformly coats over fused toner-based images that have been covered with a fuser oil. This varnish may also be effectively used with xerographic machines or offset prints free of fuser oil. The uniform coating over either type of image is achieved as a result of the blend of surfactants, viscosity modifiers and latex emulsion(s).

In embodiments, the varnish disclosed herein may be applied to a toner image after the toner has substantially been fused to the recording medium, for example, paper, cardboard, cloth and the like. The toner image may be partially covered by fuser oil from the printing apparatus. The varnish composition disclosed herein may be used on toner images totally, partially or not at all covered with fuser oil. If the toner image is at least partially covered with fuser oil, the static surface tension of the varnish will substantially match the static surface tension of the fuser oil. "Partially" as used herein refers to, for example, the surface of a toner image being covered from about 1 percent to about 99 percent, such as from 5 percent to about 95 percent or from about 10 percent to about 90 percent. "Substantially match" refers to, for example, the difference between the static surface tension of the varnish and the static surface tension of the fuser oil being about 25 percent or less, such as from about 0.001 percent to about 20 percent or from about 0.01 percent to about 15 percent.

The toner image discussed herein may be formed from any suitable toner or developer, for example including emulsion/aggregation (EA) and toner produced by a mechanical process. Suitable EA toners that may be used with the varnish disclosed herein include polyester EA toners, such as those disclosed in U.S. Pat. No. 5,593,807, U.S. Pat. No. 5,290,654. U.S. Pat. No. 5,308,734, and U.S. Pat. No. 5,370,963, each of which is incorporated herein by reference in their entirety. In embodiments, the toner may be a styrene actylate EA toner, such as those disclosed in U.S. Pat. No. 5,278,020, U.S. Pat. No. 5,346,797, U.S. Pat. No. 5,344,738, U.S. Pat. No. 5,403, 693, U.S. Pat. No. 5,418,108, and U.S. Pat. No. 5,364,729, each of which is incorporated herein by reference in their entirety.

The varnish dries upon application to the substrate and on exposure to heat and/or air. Application of UV light is not necessary to dry the varnish. However, a UV lamp may be used to dry the varnish, for example when used as a heat source. Upon drying, the varnish may also harden.

The varnish dries at slightly elevated temperatures, for example above 15° C. In embodiments, the varnish dries at temperatures from about 15° C. to about 90° C., such as from about 20° C. to about 80° C. or from about 25° C. to about 60° C. The speed at which the varnish may be dried and hardened is from about 0 ft/min. to about 100 ft/min., such as from about 10 ft/min. to about 100 ft/min. or from about 20 ft/min. to about 100 ft/min.

viscosity modifier, as described above, may optionally be added to achieve the viscosity levels disclosed herein. Each of these steps takes place at room temperature, for example, from about 20° C. to about 27° C.

The amino alcohol or alkali base is added to the mixture. This may be done by, for example, drop-wise addition of the amino alcohol or alkali base. Sufficient amino alcohol or alkali base is added such that the pH of the varnish composition is from about 8 to about 10, such as from about 8 to about 9.5 or from about 8.5 to about 9.5. If the viscosity of the varnish is adversely affected by the addition of the amino alcohol or alkali base, another viscosity modifier may be added to further adjust the viscosity to the levels discussed above.

The following Examples are submitted to illustrate embodiments of the present disclosure.

EXAMPLES

An example of a varnish that can be selected for use in the parameters of xerographic printing and the method of making such a varnish is set forth below in Table 1.

TABLE 1

Formulation Components

| Component | Chemical Composition | Amount (wt. percent) |
|---|---|---|
| Latex Emulsion | Acrylic Emulsion (Rohm &Haas RHOPLEX ® HA-12) | 64.8 |
| Latex Emulsion | Acrylic Emulsion (Rohm &Haas RHOPLEX ® I-2074) | 21.9 |
| Water | Deionized Water | 5.5 |
| Amino Alcohol | 2-amino-2-methyl-1-propanol solution (95 percent) (DOW AMP-95) | 3.4 |
| Surfactant(s) | AP 504: Butanedioic acid, 1,4-Bis(2-ethylhexyl)ester, Sodium Salt FC4432: Perfluorobutane sulfonate (Air Products SURFYNOL ® 504/ 3M NOVEC ® FC 4432) | 0.7 (0.63 weight percent SURFYNOL ® 504) and (0.07 weight percent NOVEC ® FC 4432) |
| Viscosity Modifier | Alkali swellable, crosslinked, acrylic thickener (Rohm &Haas ACRYSOL ® ASE-60) | 3.6 |
| Viscosity Modifier | Hydrophobically modified alkali swellable emulsion (Elementis RHEOLATE ® 450) | ≦0.1 |

When applied, for example when the varnish is wet, the varnish may be applied to have a thickness from about 2 μm to about 10 μm, such as from about 2 μm to about 8 μm or from about 3 μm to about 7 μm. When the varnish has dried and hardened, it has a thickness of from about 0.5 μm to about 5 μm, such as from about 0.5 μm to about 5 μm or from about 1 μm to about 3 μm.

In embodiments, the varnish disclosed herein may be prepared by first blending the latex emulsion, or more than one latex emulsion, as described above. The additional water and surfactant may then be independently added to the latex emulsion mixture, and then mixed. As discussed above, more than one surfactant may be pre-blended before being added to the aqueous mixture. The surfactants suitable for use herein are described in more detail above. After the one or more surfactants is blended with the more than one latex emulsion, a The RHOPLEX® HA-12 and RHOPLEX® I-2074 were blended together with medium shear and allowed to mix for approximately thirty minutes. The water component and the surfactants (SURFYNOL® 504 and NOVEC® FC 4432, pre-blended in a 90:10 ratio) were independently added to the latex emulsions and allowed to mix for an additional thirty minutes. After sufficient mixing, the ACRYSOL® ASE-60 was added to the formulation and allowed to blend for thirty minutes. After the allotted time a pH meter was inserted into the mixture in order to monitor the pH of the coating. This was necessary as ACRYSOL® ASE-60 is an alkali swellable thickener (viscosity modifier) and is heavily pH dependent. The AMP-95 was added in a drop wise fashion of about 1 drop about every 5 seconds and the pH allowed to stabilize between additions. The final pH was approximately 8.5.

At this point, the coating can be measured for viscosity. If the viscosity is less than 130 centipoise at room temperature, then small additions of RHEOLATE® 450 may be added in order to increase the viscosity to approximately to about 140 centipoise or to about 200 centipoise.

Example 2

Sample toner images were made using mechanically manufactured toners with four colors, cyan, magenta, yellow and black (CMYK). Toner mass per unit area (TMA) for the color black is controlled to a value of 0.50±0.5 mg/cm$^2$, which is representative of a monolayer image. Sample images were made on the papers listed in Table 2 below.

TABLE 2

Papers for Sample Images

| Paper Name | Coated/Uncoated | Basis Weight |
|---|---|---|
| White McCoy Gloss Cover | Coated | 100 pound |
| White McCoy Silk Cover | Coated | 100 pound |
| Mohawk Navajo | Film Coated | 32 pound |
| Hammermill Laser Print | Uncoated | 24 pound |

Sample images were fused onto an electrostatographic fusing apparatus. Images were fused at a temperature of 185° C. and a process speed of 30 meters/minute. A total of 50 feeder sheets were fed through the fuser prior to fusing the image in order to stabilize the oil rate. Once the image passed through the fuser, the paper was attached to a lead sheet and fed through a lab coater at a speed of 30 meters/minute. The 140 lines per inch roll in the coater resulted in a coating thickness of approximately 2 microns (dry). The image was then placed on the belt of a Fusion UV Systems at a speed of approximately 10 meters/minute and allowed to dry under the heat generated by the UV lamp (82° C.). Under these conditions, the above formulation provided sufficient wetting to allow for a uniform coating over an oil coated, fused-toner print while not employing ammonia in the formulation.

It will be appreciated that various of the above-disclosed and other features and functions, or alternatives thereof may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A xerographic print, comprising:

a substrate with a toner-based image, wherein the toner-based image has residual release oil present thereon, and a varnish composition at least partially covering the toner-based image and residual release oil, wherein the varnish composition before drying has a viscosity of from about 50 cP to about 750 cP at about 25° C. and a surface tension of from about 15 mN/m to about 40 mN/m at about 25° C. and comprises:

at least one water based latex emulsion, wherein the at least one water based latex emulsion is a water based acrylic, styrene acrylic, or polyester latex emulsion;

at least one amino alcohol selected from the group consisting of 2-aminoethanol, 2-aminopropanol, 2-aminobutanol, 2-aminohexanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-2-ethyl-1,3-propanediol, tris-(hydroxymethyl)-aminomethane, triisopropanolamine, 2-dimethylamino-2-methyl-1-propanol and mixtures thereof;

at least one surfactant; and at least one viscosity modifier, wherein the static surface tension of the varnish composition will substantially match the static surface tension of the residual release oil, and wherein the varnish composition does not adversely affect a xerographic photoreceptor life.

2. The xerographic print according to claim 1, wherein the residual release oil is a functionalized silicone oil.

3. The xerographic print according to claim 2, wherein the residual release oil may cover the substrate and toner-based image at levels from about 1% to about 99% on an area basis, and the surface energy in areas covered by the residual release oil is from about 15 mN/m to about 40 mN/m.

4. The xerographic print according to claim 1, wherein the at least one water based latex emulsion is self-crosslinking and/or alkali soluble.

5. The xerographic print according to claim 1, wherein the at least one amino alcohol is an alkyl alcohol having at least one amino group.

6. The xerographic print according to claim 1, wherein the at least one surfactant is an anionic surfactant, a nonionic surfactant, a silicone surfactant, a fluorosurfactant, or a mixture thereof.

7. The xerographic print according to claim 1, wherein the at least one surfactant is a perfluorobutane sulfonate, a branched secondary alcohol ethoxylate, or a mixture thereof.

8. The xerographic print according to claim 1, wherein the at least one viscosity modifier comprises an acrylic alkali swellable emulsion or an associative thickener.

9. The xerographic print according to claim 1, wherein the at least one water based latex emulsion is from about 40 weight percent to about 95 weight percent of the varnish composition, the at least one amino alcohol is from about 1 weight percent to about 5 weight percent of the varnish composition, the at least one surfactant is from about 0.01 weight percent to about 7.99 weight percent of the varnish composition and the least one viscosity modifier is from about 0.01 weight percent to about 8 weight percent of the varnish composition.

10. The xerographic print according to claim 1, wherein the total glass transition temperature of the at least one water based latex emulsion is from about 30° C. to about 95° C.

11. The xerographic print according to claim 1, wherein the varnish composition before drying may further comprise one or more additives selected from the group consisting of UV absorbers, coalescing aids, matting agents, biocides, crosslinking agents, antifoaming agents, waxes, silica, and colorants.

12. A method of making a xerographic print, comprising:

providing a substrate with a toner-based image thereon, wherein the toner-based image has residual release oil present thereon, at least partially coating the toner-based image and residual release oil with a varnish composition, wherein the static surface tension of the varnish composition will substantially match the static surface tension of the residual release oil, wherein the varnish composition before drying has a viscosity of from about 50 cP to about 750 cP at about 25° C. and a surface tension of from about 15 to about 40 dynes/cm at about 25° C., wherein the varnish composition does not adversely affect a xerographic photoreceptor life and comprises:

at least one water based latex emulsion, wherein the at least one water based latex emulsion is a water based acrylic, styrene acrylic, or polyester latex emulsion, at least one amino alcohol selected from the group consisting of 2-aminoethanol, 2-aminopropanol, 2-aminobutanol, 2-aminohexanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-2-ethyl-1,3-propanediol, tris-(hydroxymethyl)-aminomethane, triisopropanolamine, 2-dimethylamino-2-methyl-1-propanol and mixtures thereof;

at least one surfactant, and at least one viscosity modifier, and exposing the coated toner-based image to a drying source in order to at least substantially form a continuous latex film while evaporating off remaining components of the varnish composition.

13. The method according to claim 12, wherein the residual release oil is a functionalized silicone oil.

14. The method according to claim 13, wherein the residual release oil covers the substrate with toner-based image thereon at levels from about 1% to about 99% on an area basis, and the surface energy in areas covered by the residual release oil is from about 15 mN/m to about 40 mN/m.

15. The method according to claim 12, wherein the varnish composition covers the entire substrate having the toner-based image thereon.

16. The method according to claim 12, wherein the providing the substrate with the toner-based image thereon comprises:

providing a substrate, and forming a toner-based image on at least part of a surface of the substrate by an electrographic process that utilizes a release agent.

17. A printing system for creating a durable toner-based image on a substrate, comprising: a xerographic print engine connected to a liquid film coating device and a drying station, wherein the liquid film coating device applies a varnish composition comprising:

at least one water based latex emulsion, wherein the at least one water based latex emulsion is a water based acrylic, styrene acrylic, or polyester latex emulsion, at least one amino alcohol selected from the group consisting of 2-aminoethanol, 2-aminopropanol, 2-aminobutanol, 2-aminohexanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-2-ethyl-1,3-propanediol, tris-(hydroxymethyl)-aminomethane, triisopropanolamine, 2-dimethylamino-2-methyl-1-propanol and mixtures thereof;

at least one surfactant, and at least one viscosity modifier, wherein the varnish composition has a viscosity of from about 50 cP to about 750 cP at about 25° C., and a surface tension of from about 15 mN/m to about 40 mN/m at about 25° C., and wherein the static surface tension of the varnish composition will substantially match the static surface tension of the residual release oil and wherein the varnish composition does not adversely affect a xerographic photoreceptor life.

18. The system according to claim 17, wherein the varnish composition is applied to the recording medium using a roll coater, a rod coater, a blade, a wire bar, an air-knife, a curtain coater, a slide coater, a doctor-knife, a screen coater or a gravure coater.

19. The system according to claim 17, wherein the wet thickness of the varnish is from about 2 μm to about 10 μm.

20. The system according to claim 17, wherein the dry thickness of the varnish is from about 0.5 μm to about 5 μm.

21. The system according to claim 17, wherein the durable toner-based image is obtained by generating an electrostatic latent image on a photoconductive imaging member, developing the latent image with a toner, transferring the developed electrostatic image from the photoconductive imaging member to the substrate, and at least partially coating the substrate and/or the toner-based image with the varnish composition.

* * * * *